United States Patent [19]
Smith

[11] 3,735,433
[45] May 29, 1973

[54] MACHINE FOR UNCAPPING WAX HONEYCOMB

[76] Inventor: John T. Smith, P.O. Box 786, Blountstown, Fla. 32424

[22] Filed: July 13, 1971

[21] Appl. No.: 162,115

[52] U.S. Cl. .................................................. 6/12 A
[51] Int. Cl. ............................................. A01k 59/02
[58] Field of Search .............................. 6/12 A, 12 U

[56] References Cited
UNITED STATES PATENTS

| | | |
|---|---|---|
| 2,580,397 | 1/1952 | Bogenschutz .......................... 6/12 A |
| 3,388,409 | 6/1968 | Hettrick ................................ 6/12 A |
| 3,581,324 | 6/1971 | Davidson, Jr. ......................... 6/12 A |

Primary Examiner—Lucie H. Laudenslager
Attorney—Clarence A. O'Brien and Harvey B. Jacobson

[57] ABSTRACT

A machine for uncapping honeycombs including a feeding mechanism for depositing honeycombs on a conveyor chain in sequential relation with the conveyor chain conveying the honeycomb through a buffing or cleaning station in which the honeycombs are cleaned, through a cutting station where the honeycombs are uncapped and then supporting the honeycombs in overlying relation to a drain tank.

16 Claims, 15 Drawing Figures

PATENTED MAY 29 1973 3,735,433

John T. Smith
INVENTOR.

BY Clarence A. O'Brien
and Harvey B. Jackson
Attorneys

Fig. 5

John T. Smith
INVENTOR.

John T. Smith
INVENTOR.

John T. Smith
INVENTOR.

MACHINE FOR UNCAPPING WAX HONEYCOMB

BACKGROUND OF THE INVENTION

1. Field of the Invention

The present invention relates to a machine for uncapping honeycombs and includes a feeding conveyor mechanism to discharge honeycombs in a vertical orientation for horizontal movement through the machine on a chain-type conveyor with a cleaning or brushing assembly and a cutting or uncapping assembly serving to clean the honeycombs and then uncap the honeycombs after which the honeycombs are conveyed to a drip tank and supported in vertical position thereon.

2. Description of the Prior Art

Heretofore, various machines have been provided for uncapping honeycombs. Typical of such machines is disclosed in U.S. Pat. No. 3,388,409 issued to William R. Hettrick on June 18, 1968 in which honeycomb frames are fed downwardly between horizontally disposed opposed knives which are in the form of scraper knives and the uncapped honeycombs then being supported over a drip tank. U.S. Pat. No. 2,580,397 issued to Thomas M. Bogenschutz on Jan. 1, 1952 also discloses a machine for uncapping honeycombs in which the honeycombs are fed downwardly between opposed rotatable knives which uncap the honeycomb. Other patents disclosing machines for uncapping honeycombs are U.S. Pat. Nos. 3,293,672; 3,068,496; 2,807,034; 2,457,301; 2,448,775; 2,272,808; 2,261,529 and 1,523,963.

While the above-mentioned prior patents disclose various machines for uncapping honeycombs, the machine of the present invention effectively solves the problem of feeding the honeycombs singly into the machine and maintains the honeycomb under control for movement first through a brush assembly which removes wax from the top and bottom of the frame of the honeycomb and subsequently moves the honeycomb through planer heads which cut the honeycomb caps and sling the honeycomb cappings away from the honeycomb with uncapped or decapped honeycombs then being fed into a frame converter structure which inverts the frame and positions it on a drip tank conveyor chain.

SUMMARY OF THE INVENTION

The honeycomb uncapping machine of this invention includes basically three assemblies including a feeding assembly, a cleaning and uncapping assembly and a drip tank assembly with the three assemblies being so interrelated that honeycomb frames are placed on a feeding conveyor from where they are discharged onto a chain conveyor in an upright manner and are supported on the chain conveyor as they pass through the cleaning and uncapping assembly. The cleaning assembly includes opposed brushes which are rotatable and which will brush away all wax from the frame top and bottom with the brushed away wax hitting a wax shield and falling through an appropriate aperture into a suitable container. The honeycomb frame then passes between planer heads which are rotating at a relatively high rate of speed so that planar blades thereon will cut the honeycomb and sling the cappings onto a wax and honey shield from which it is deposited into a suitable container thereby assuring that all wax will be discharged into appropriate containers and the wax which has been cut away from the honeycomb will not lodge on the honeycomb. From the uncapping assembly, the honeycomb frames which are still in their upright position with the top of the honeycomb being at the lower edge thereof are positioned in a frame converter which inverts the frames and supports them on conveyor chains overlying a drip tank. The machine of the present invention maintains positive control of the honeycomb throughout its movement and the structure provides for long-lasting and efficient operation with very little maintenance required. The honeycombs will be effectively uncapped without damage to the honeycomb frame thus enabling re-use of the honeycomb after it has been uncapped and the honey removed therefrom.

Figure 1:
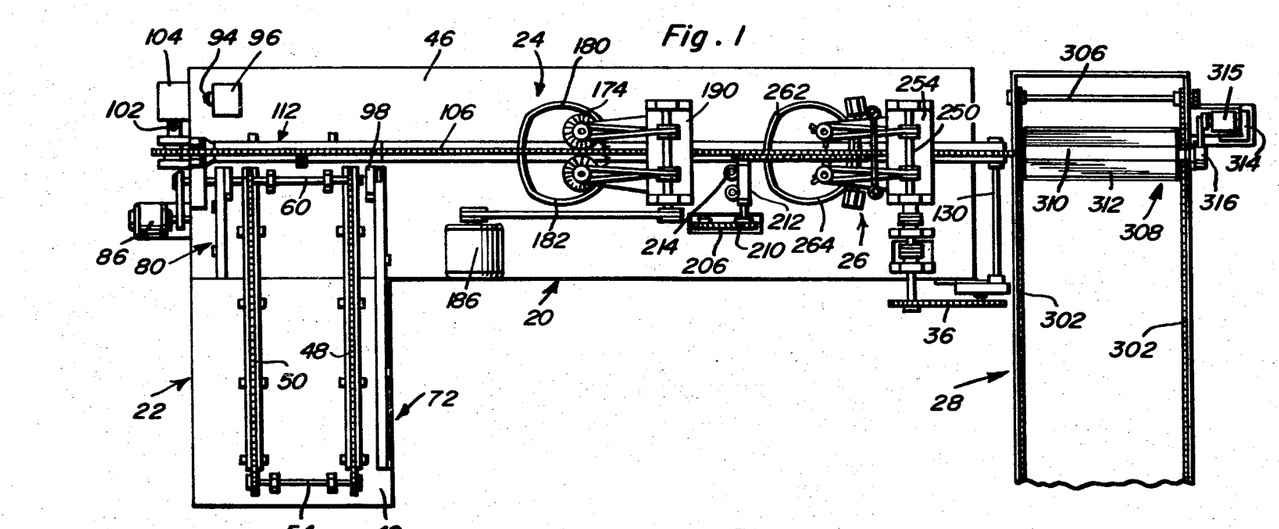
FIG. 1 is a top plan view of the honeycomb uncapping machine illustrating the relative position of the assemblies thereof.
Figure 14:
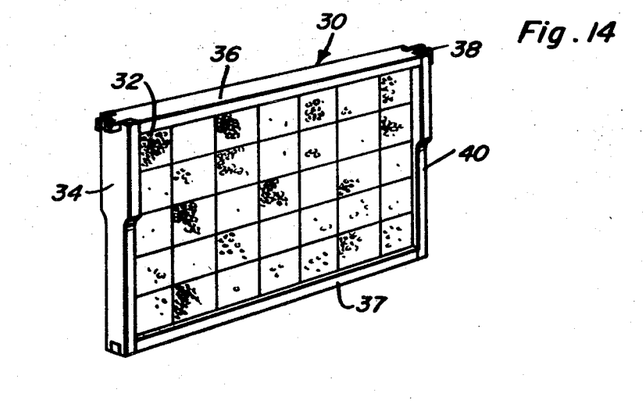
FIG. 14 is a perspective view of a honeycomb illustrating the specific construction of the frame and depicts a conventional honeycomb.

DESCRIPTION OF THE PREFERRED EMBODIMENT:

The honeycomb uncapping machine of the present invention is generally designated by reference numeral 20 and the orientation of the components thereof is best illustrated in FIG. 1 of the drawings. The machine 20 includes a feeding assembly generally designated by the numeral 22, a brushing and cleaning assembly generally designated by the numeral 24, a cutting assembly or planer head generally designated by the numeral 26 and a drip tank assembly including a frame converter generally designated by the numeral 28. The machine effectively removes wax cappings from a honeycomb which is conventional in construction and illustrated in FIG. 14 and identified by reference numeral 30. The honeycomb 30 includes wax cappings 32 and a frame structure including end rails 34 interconnected by a top rail 36 and a bottom rail 37 thus forming a rectangular frame. The ends of the top rail 36 project beyond the end rails or end members 34 with the projections defining lugs 38 which support the honeycomb while it is positioned in the beehive. The side edges of the end members 34 of the frame have the lower portion thereof slightly recessed as at 40 with it being pointed out that the honeycomb 30 is conventional in and of itself and forms no particular part of the present invention except for its association with the various assemblies which form the uncapping machine.

The feeding assembly 22 includes a generally horizontally disposed supporting platform, table top or the like designated by the numeral 42 and which may be supported in any suitable manner such as by depending supporting legs, frame members or the like 44. The platform or table top 42 is in alignment with a similar elongated platform or table top 46 which actually forms part of the feeding assembly and also the brushing assembly and the cutting assembly with the platform 42 generally extending perpendicularly from the end portion of one side edge of the elongated platform or table top 46. Similar supporting elements or supporting frame elements are employed for supporting the table top or platform 46 and are also designated by reference numeral 44. The specific construction of the supporting framework and the table top structure may vary in that it is not necessary for the table top to be continuous since it is only necessary to provide a supporting function for the components of the machine.

Mounted horizontally on the table top 42 and extending partially across the end portion of the table top 46 is a pair of endless conveyor chains 48 and 50 which are disposed in horizontal alignment with each other and which are spaced apart a distance less than the length of a honeycomb 30. At one end, the conveyor chains 48 and 50 are entrained over a pair of sprocket gears 52 supported on the ends of a horizontally disposed shaft 54 which is supported from the table top 42 by bearing blocks 56 or the like. The other end of the conveying chains 48 and 50 are entrained over sprocket gears 58 supported on a horizontal shaft 60 journaled from the table top 46 by bearing blocks 62 so that both the upper and lower run of the conveyor chains 48 and 50 are substantially parallel.

Figure 3:
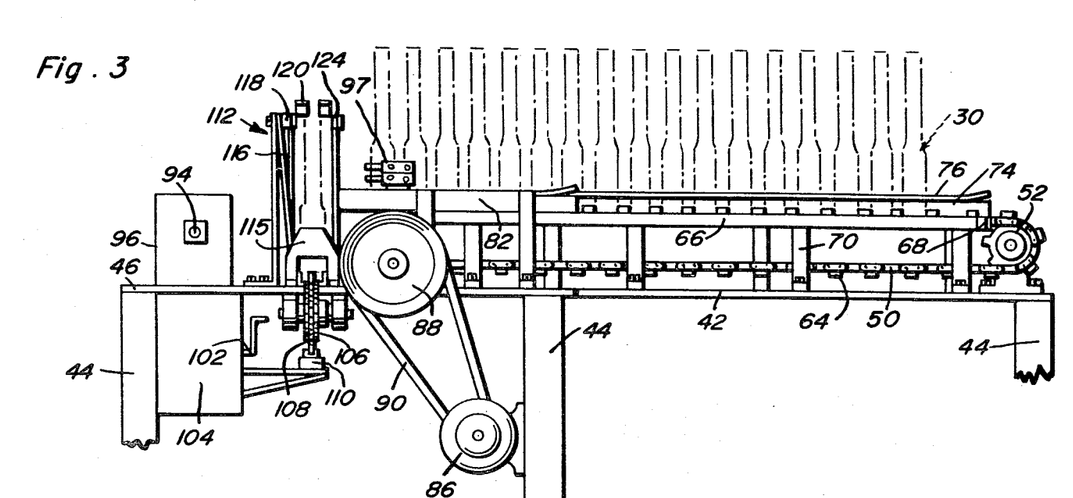
FIG. 3 is a side elevational view of the feeding mechanism illustrating the orientation of the honeycombs thereon and the position of the honeycombs when discharged onto the chain conveyor.
Figure 4:
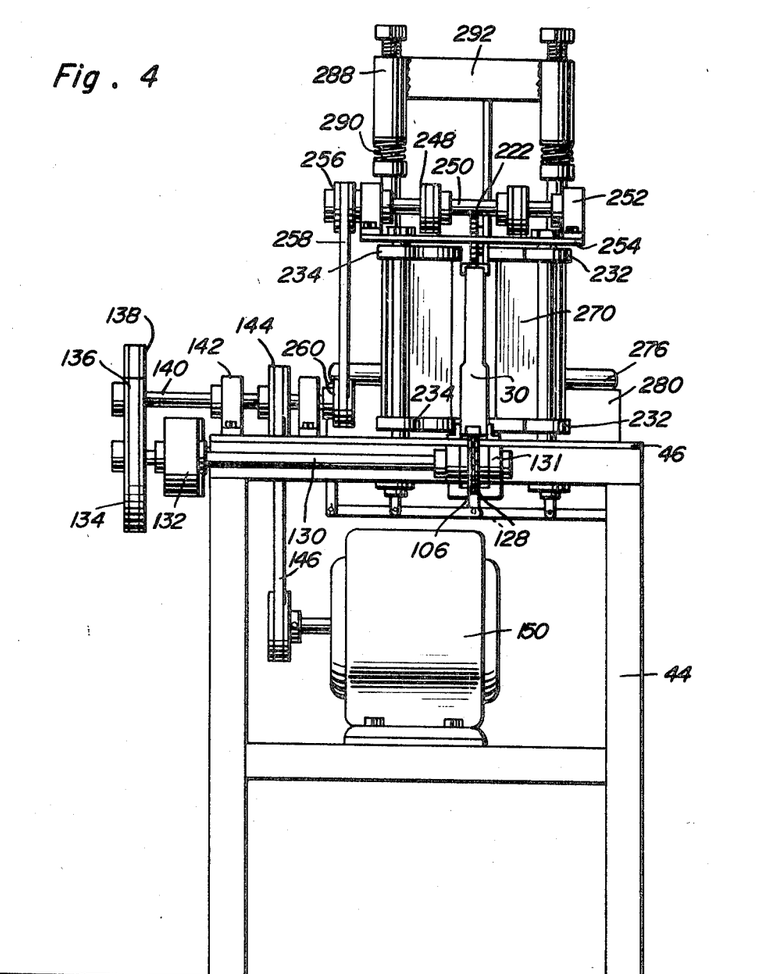
FIG. 4 is an end view of the planer heads.
Figure 5:
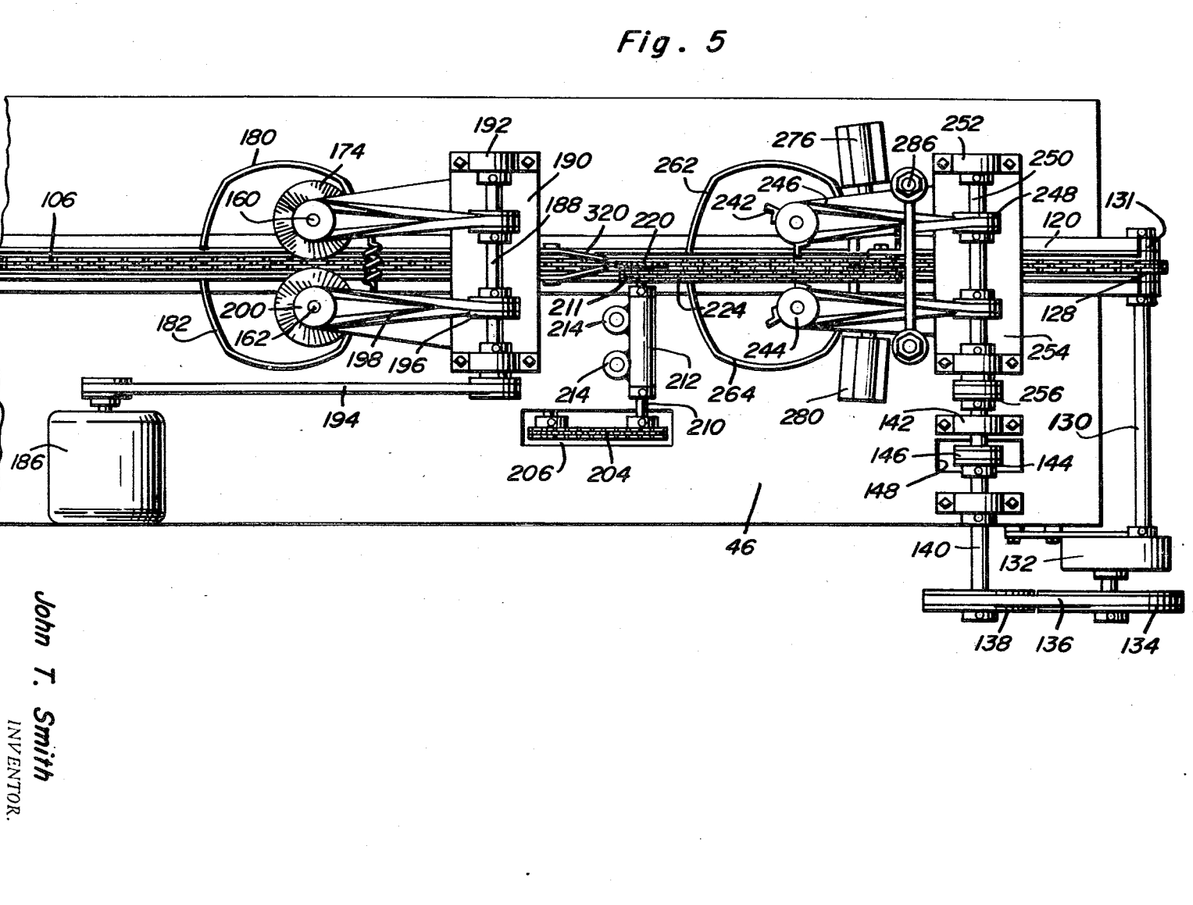
FIG. 5 is a top view of the planer heads and brush assembly.
Figure 6:
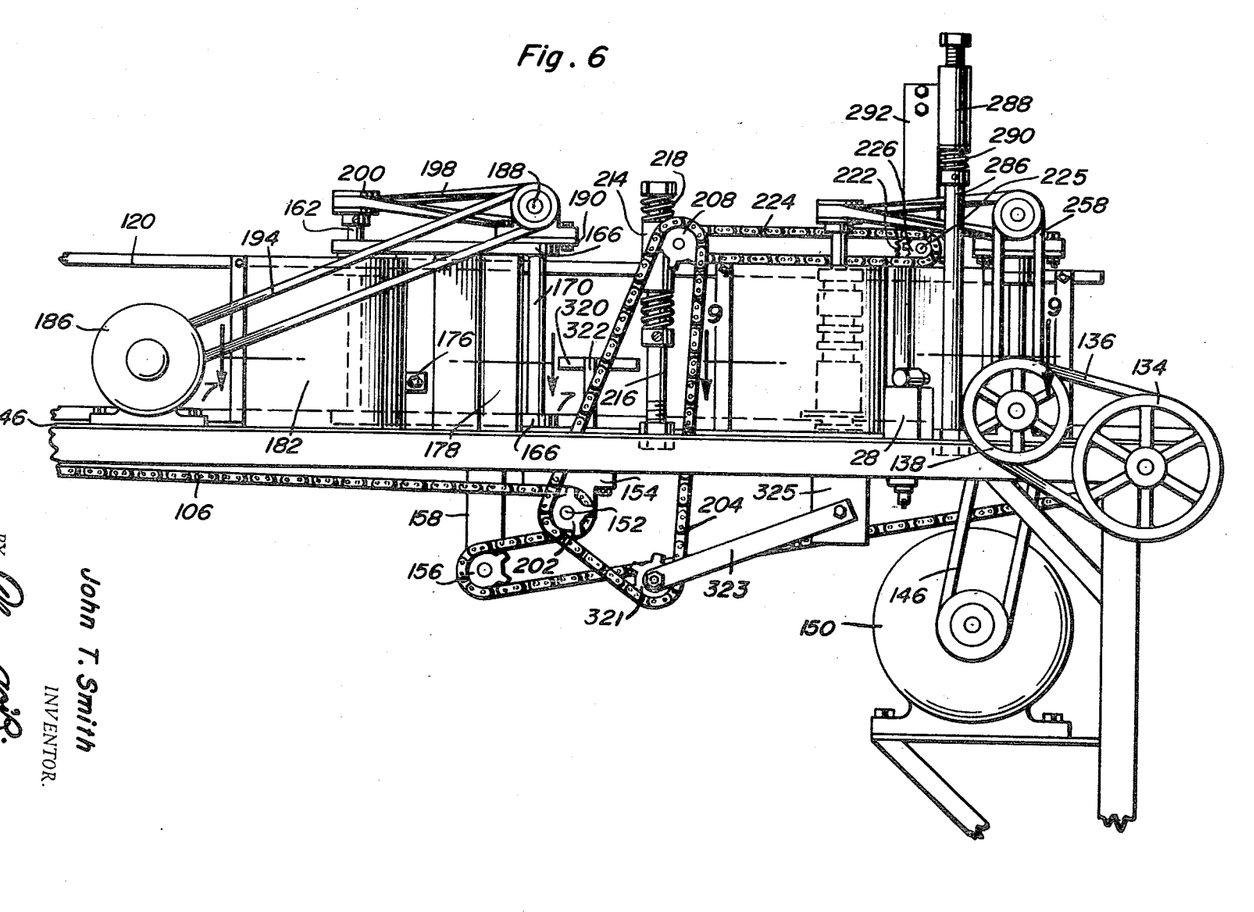
FIG. 6 is a side elevational view of the planer heads and brush assemblies.

As illustrated in FIG. 3, each conveyor chain 48 and 50 has a plurality of lugs 64 thereon which project outwardly from the respective conveyor chain and which are spaced apart sufficiently and are of a sufficient height to engage and convey honeycombs 30 which have been oriented in inverted position, that is, with the top bar 36 disposed downwardly as illustrated in FIG. 3.

Supporting the undersurface of the upper run of each conveyor chain 48 and 50 is an elongated track 66 which may be channel-shaped in configuration and provided with an outwardly flared entrance end 68 to guide the chain into the track 66. The track 66 is supported by a plurality of upstanding brackets 70 secured to the table top 42 in any suitable manner. Disposed alongside of but spaced from the chain 48 is a guide rail 72. The guide rail 72 includes a vertical wall member 74 and a top horizontal inwardly extending wall or ledge 76 which is adapted to overlie the lugs 38 on the honeycomb 30 when the honeycombs are positioned on the conveyor chains with the end edge of the lug in abutting engagement with the vertical wall 74. The wall 74 and wall 76 are flared at their entrance ends for facilitating positioning of the honeycombs on the conveyor chains and facilitating positioning of the lugs 38 under the ledge or rail 76. The rail 72 is supported in any suitable manner by brackets 78 and this rail serves to guide one end of the frames which are positioned on the chains 48 and 50 with the other ends of the honeycombs being free over a substantial portion of the length of the chains 48 and 50 but including a relatively short guide rail 80 adjacent the discharge end of the conveyor chains 48 and 50. This guide rail is similar in construction to the guide rail 72 and includes a vertical wall 82 and a top horizontal wall 84 both of which are flared outwardly at their entrance ends so that the other lugs at the opposite end of the honeycomb will be received thereunder which provides a positive guide for the honeycombs and retains them in their upright position as they move towards the discharge end of the conveyor chains 48 and 50.

The conveyor chains 48 and 50 are driven by rotating the shaft 60 by the use of a suitable power source such as an electric motor 86 driving a pulley 88 through a belt drive 90 with the pulley providing an input to a reduction gear assembly 92 which has the output thereof engaged with the shaft 64 driving the same at a reduced speed. The motor 86 is supported from a suitable bracket on the supporting frame structure 44 and provides power for moving the conveyor chains. A manual feeder chain switch 94 is provided on a suitable control box 96 for manually actuating the motor 86 which moves the honeycombs 30 by the means of the lugs 64 toward the discharge end of the chains 48 and 50. The honeycombs are moved along the conveyor guides 66 until they are on frame levers 98 and the lugs 38 on the honeycomb frame are disposed under frame stabilizers 100 which are attached to the ends of the guide rails 72 and 80. The main switch 102 on a main switch box 104 is then actuated to actuate the brushing assembly and cutting assembly and to actuate a conveyor chain 106 having spaced lugs 108 thereon. As the lugs 108 on the conveyor chain 106 of the uncapping machine moves over the feeder chain motor start microswitch 110, it will be actuated to start the feeder chain motor 44 again. This will move the honeycomb from frame levers 98 into a vertical guide structure 112 for the honeycombs 30. As the honeycomb falls into the guide structure 112, it passes over the feeder chain motor stop microswitch 114 which stops the feeder chain. The decapper conveyor chain 106 convinues moving until the lug 108 pushes the honeycomb 30 along the honeycomb guide 112. As this honeycomb moves along, another lug 108 on the chain 106 passes over the feeder chain motor start microswitch 110 and the process of the automatic feeder starts over. Thus, the conveyor chain 106 controls operation of the feeder chain motor 86 since the stop switch 114 for the motor 86 will not be released until the honeycomb in the guide structure 112 has been moved outwardly thereof by the conveyor chain 106. As this occurs, the next lug 108 on the conveyor chain 106 will actuate the start switch 110 and thus again operate the motor 86 for feeding another honeycomb 30 into the guide structure 112.

Figure 8:
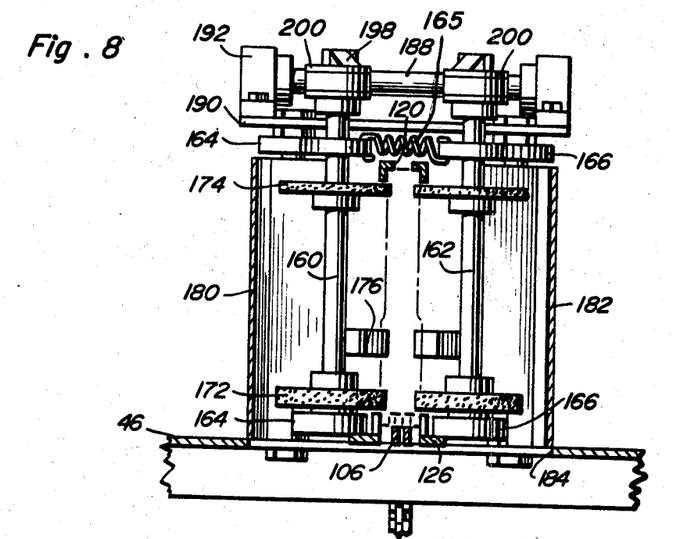
FIG. 8 is a sectional view taken substantially upon a plane passing along section line 8—8 of FIG. 7 illustrating further structural details of the brush assembly.
Figure 9:
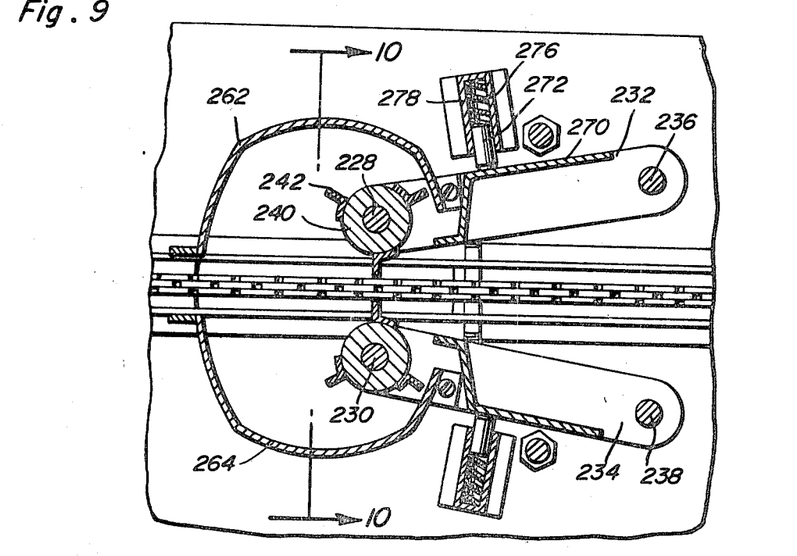
FIG. 9 is a plan sectional view taken substantially upon a plane passing along section line 9—9 of FIG. 6 illustrating further structural details of the rotatable cutters or planing heads.
Figure 10:
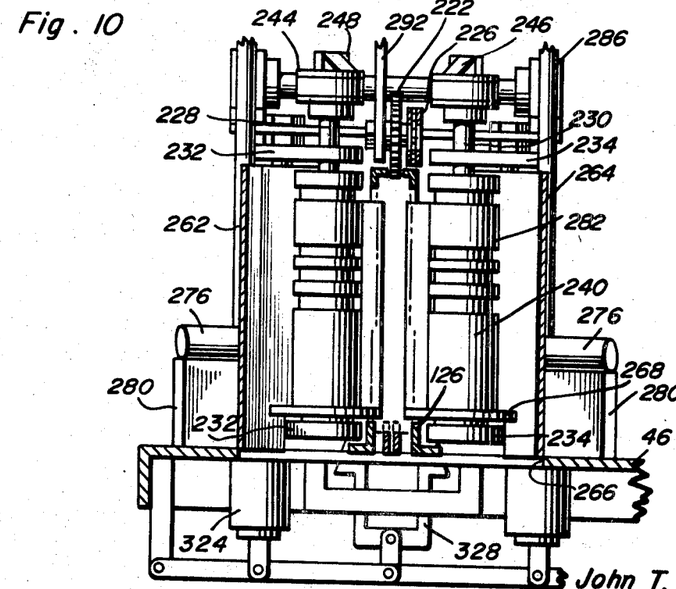
FIG. 10 is a transverse, sectional view taken substantially upon a plane passing along section line 10—10 of FIG. 9 illustrating further structural details of the planar head.
Figure 11:
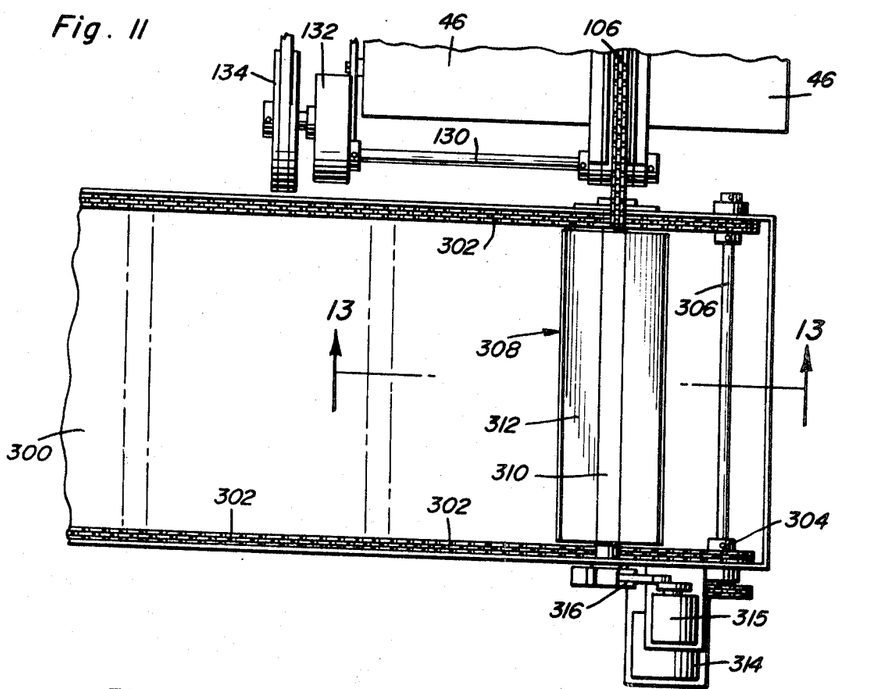
FIG. 11 is a plan view of the drip tank illustrating the frame converter therein.
Figure 12:
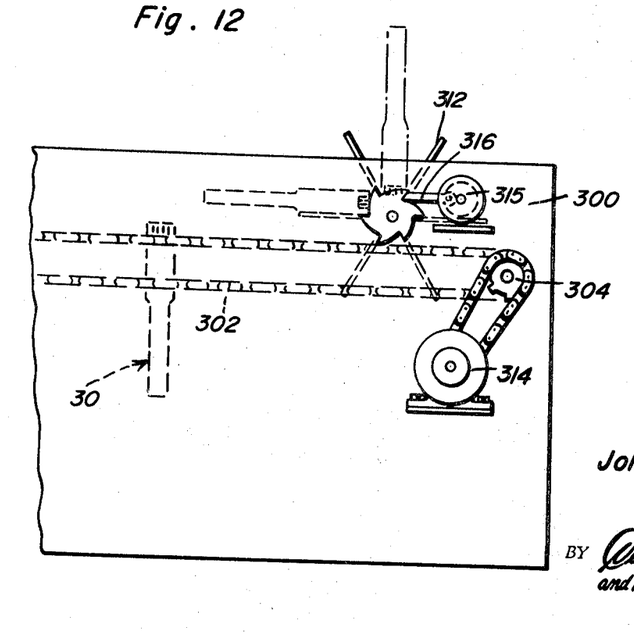
FIG. 12 is a side elevational view of the drip tank, illustrating the operation of the frame converter and the positioning of the frames on the supporting conveyor chain in the drip tank.

The guide structure 112 includes an upwardly extending end plate 115 which is inclined outwardly to guide the honeycombs downwardly and advance them toward the brush assembly so that as the honeycombs 30 are disengaged from the spring finger or stabilizer 100 and slide off of the levers or members 98, the end member 115 will assure proper orientation of the honeycombs. Also, an upstanding guide plate or wall 116 of sheet metal oriented in opposed relation to the discharge from the conveyor chains 48 and 50 guides and supports the honeycombs 30 and retains them substantially in a vertical position. Along the top of the plate 116 is a guide rail 118 which guides the top ends of the honeycombs into engagement with guide rails 120 which extend in overlying relation to the conveyor chain 106. A similar guide plate 112 is provided for the lower ends of the honeycombs as they are discharged from the chains 48 and 50 so that the lower ends of the honeycombs will be engaged by the lugs on the conveyor chain 106. The top end of the guide plate 122 of course terminates below the point of discharge of the honeycombs into the guide structure 112 and a similar guide rail 124 is provided to guide the approaching end of the honeycomb between the guide rails 120 as the honeycombs leave the guide structure 112. The shape and configuration of the guide rails 120 is best seen in FIGS. 8 and 10 in which these elements are illustrated as being of L-shape or right angular configuration to form a guide for the upper end of the honeycomb 30. In addition, the chain 106 runs along the table top surface and has a pair of guide rails 126 extending alongside thereof which guides the honeycombs 30 along the bottom thereof. Thus, as the honeycombs are propelled along the length of the table surface 46, the lower edge of the honeycomb will be guided by the rails 126 and propelled by the lugs 108 on the chain 106 and the upper edge of the honeycomb will be guided by the rails 120 thus maintaining positive and accurate control of the honeycomb during its movement through the brushing assembly 24 and the cutting assembly 26.

Figure 2:
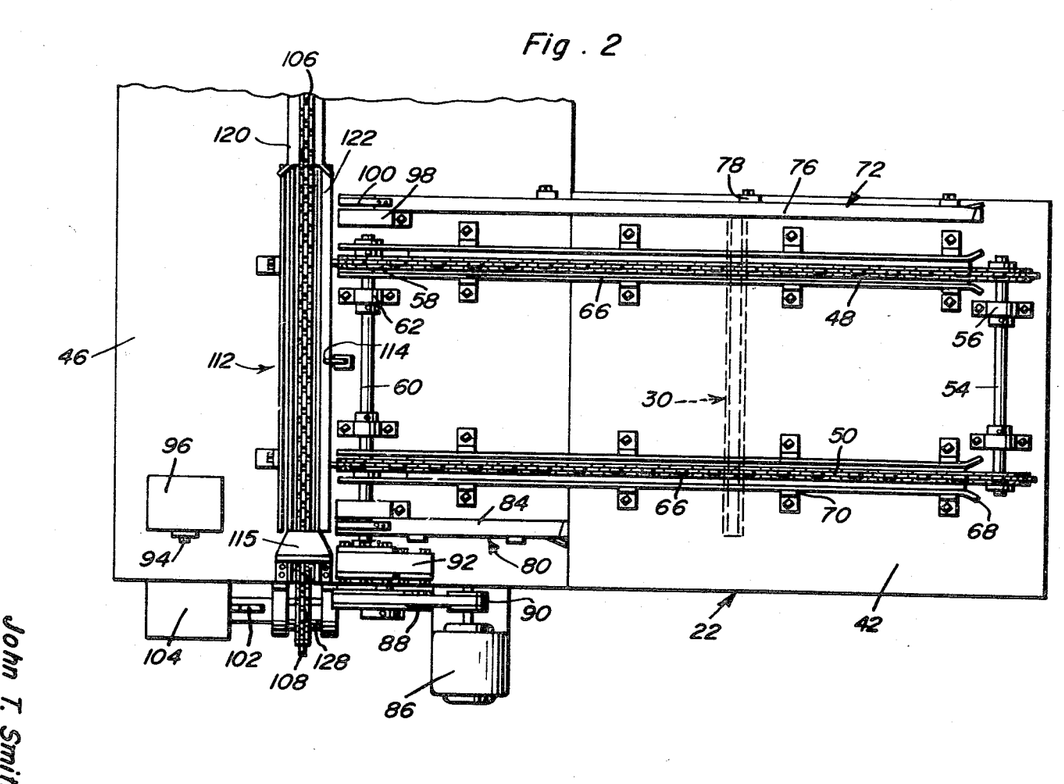
FIG. 2 is a plan view of the automatic feeding mechanism illustrating its relationship to the chain conveyor of the machine.

As illustrated in FIG. 2, the conveyor chain 106 extends around a sprocket gear 128 at the edge of the table surface and the chain extends continuously along the top surface of the table top 46 and over a sprocket gear 128 at the opposite end of the elongated table top surface 46. The sprocket gear 128 is supported by a shaft 130 supported by bearing blocks 131 and being supported by and driven by a reduction gear unit 132 at one end thereof which has an input shaft provided with a large pulley 134 thereon which is driven by a drive belt 136 engaged with a pulley 138 mounted on a shaft 140 supported on the table top surface by bearing blocks 142. Mounted on the shaft 140 is a pulley 144 engaged by a drive belt 146 which extends down through an opening 148 in the table for driving connection with a motor 150 supported from the frame structure of the table in a conventional manner.

The chain conveyor 106 also extends under the table 46 and adjacent the end thereof which has the motor associated therewith, the chain 106 extends around the major portion of the sprocket gear mounted on a horizontally disposed shaft 152 carried by journal blocks 154 mounted on the under portion of the table. The chain then extends in a reverse direction and passes over a sprocket gear 156 supported by brackets 158 connected with the under portion of the table. The chain 106 then extends to the discharge end of the table where it is engaged with the sprocket gear 128. Thus, the chain 106 travels in a straight path from one end of the table 46 to the other between the guide rails 126 with the chain being driven by the sprocket 128 at the discharge end thereof and being provided with an end sprocket at the opposite end or entrance end of the table. The idler sprocket 156 may be adjustably mounted for varying the tension on the chain and the speed of the chain 106 is determined by the reduction gear 132 which may be purchased for its desired output speed.

As the honeycombs 30 leave the guide structure 112, they are conveyed into the brushing assembly 24 which includes a pair of vertically disposed shafts 160 and 162 which are disposed on opposite sides of the chain conveyor. The shafts 160 and 162 are rotatably journaled on a pair of arms 164 and 166 which extend in diverging relation to each other and support the shafts 160 and 162 for oscillatory movement about upstanding mounting rods 168 and 170 which have their lower ends rigidly fixed with the table top 46 and which support the arms 164 and 166 adjacent the upper end thereof for angular displacement about the vertical axes defined by the rods 168 and 170 respectively. On each shaft 160 and 162, there is mounted a pair of circular brushes including a lower brush 172 and an upper brush 174. Both brushes are disk-like in configuration with the lower brush 172 being slightly wider in vertical extend as compared with the upper brush 174. The brushes 172 and 174 engage the frame members 36 and 38 respectively with the lower brushes 172 removing wax from the lower frame member 36 and the brushes 174 removing wax from the upper frame member 38 as the honeycomb 30 is moved between the brushes by the conveyor chain 106.

Figure 7:
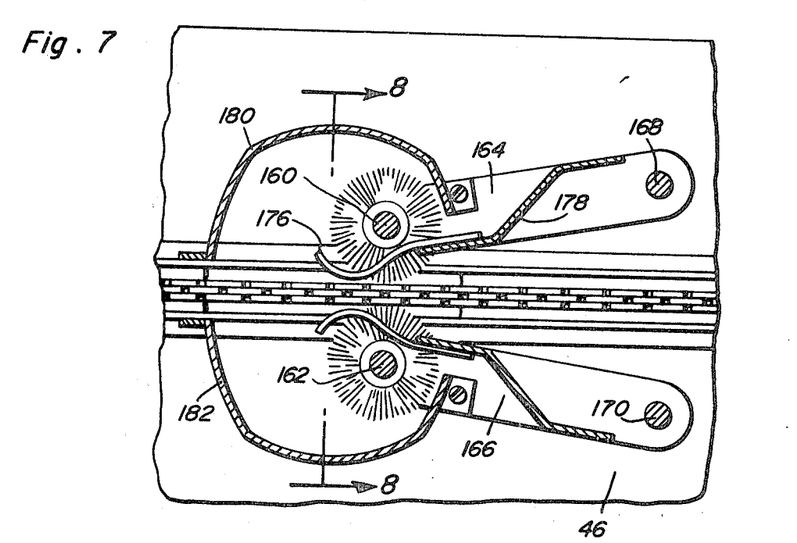
FIG. 7 is a plan sectional view taken substantially upon a plane passing along section line 7—7 of FIG. 6 illustrating the specific structural details of brush assembly.

As the honeycombs 30 approach the brushes, the leading frame member, either 34 or 40, will engage a curved finger or plate 176 attached to a mounting bracket 178 fixed to the respective arm 164 or 166. As illustrated in FIG. 7, two of the curved fingers or plates are provided and are attached to and supported from the arms 164 and 166 respectively and these fingers serve to move the arms 164 and 166 about the supporting rods 168 and 170 in order to spread the brushes apart or walk the brushes around the end frames of the honeycombs. Thus, as the honeycomb proceeds along the conveyor chain 106 guided by the top and bottom guide rails, the leading frame member comes into contact with the brush walk around plates or fingers 176 which moves the brushes 172 and 174 apart so that the frame end members 34 and 40 will not be touched by the wire brushes which are rotating a relatively high rate of speed. As soon as the end members of the frame of the honeycomb 30 pass by, the brushes 172 and 174 come into contact with anything on the wood part of the frame of the honeycomb and will brush away all wax from the frame top and bottom. As the wax is brushed away due to the relatively high rotational speed of the brushes, the wax will be discharged peripherally of the brushes and will come into engagement with a pair of vertically disposed wax shields 180 and 182 which are generally U-shaped in configuration as illustrated in FIG. 7 and extend from a point in advance of the brushes to a point in trailing relation to the brushes. The portion of the table in alignment with the brushes and the shield 180 and 182 is provided with an enlarged opening 184 which enables discharge of wax downwardly along the inner surface of the shields 180 and 182 with the wax being discharged into a suitable container which may be positioned in underlying relation to the discharge opening 184 below the brushes. As illustrated, the shafts 160 and 162 are supported by the arms 164 and 166 which are disposed adjacent the upper and lower ends of the rods 168 and 170 and are supported therefrom for arcuate swinging movement so that the shafts 160 and 162 may move arcuately towards and away from each other. The shafts 160 and 162 are supported from the arms 164 and 166 by any suitable bearing means, collars and the like which are also employed to removably position the brushes on the shafts for replacement when necessary.

The shafts 160 and 162 are rotated by an electric motor 186 supported on the table 46 which drives a horizontally disposed shaft 188 supported by a plate or platform 190 that is mounted at the upper ends of the rods 168 and 170. The shaft is supported by bearing blocks 192 and is driven by a belt drive 194 from the motor 186. The shaft 188 has pulleys 196 mounted thereon driving twisted belts 198 which encircle pulleys 200 mounted on the upper end of the shafts 160 and 162 so that the brushes 172 and 174 are rotated in a manner with the adjacent opposed peripheral surfaces moving in a direction opposite to the movement of the honeycombs 30 through the brush assembly.

After the honeycombs 30 leave the brushing assembly 24, they enter the cutting assembly 26 and they are still being guided by the upper and lower guide rails. To provide a positive drive for the honeycombs through the cutting assembly, a drive mechanism is provided for the top surface thereof which is driven from the shaft 152 and more particularly a sprocket gear 202 mounted thereon which is in engagement with a drive chain 204 which extends upwardly through an opening 206 in the table 46 and is engaged with and drives a sprocket gear 208 disposed above the table 46 and carried by a shaft 210 that is journaled in a bearing sleeve 212 rigid with a pair of vertically disposed sleeves 214 that are slidably mounted on a pair of vertically disposed rods 216 fixedly secured to the table 46 on one side of the conveyor chain 106. The sleeves 214 are slidable on the rods 216 and are spring biased into an adjusted position by coil compression springs 218 located above and below the sleeves 214 with the compression springs serving to resiliently retain the sleeves 214 in adjusted position which is initially adjusted by suitable adjustable collars or the like so that the shaft 210 may be adjusted vertically in relation to the upper guide rails 120. The end of the shaft 210 remote from the sprocket gear 208 has a cog wheel 220 mounted thereon which is in engagement with the top surface of the upper frame member 38 of the honeycomb 30 as it passes along the conveyor chain 106. The cog 220 is turning so that the peripheral speed thereof is the same as the conveyor chain 106 and this cog assists the conveyor chain to move the honeycomb through the cutting assembly 26. A second cog 22 is mounted in spaced relation to the cog 220 and is driven by a horizontally disposed sprocket chain 224 engaging a gear 226 mounted on the shaft 225 and a drive sprocket gear 211 mounted on the shaft 210 alongside of the cog 220 so that both cogs 222 and 220 will be driven at the same speed and in the same direction for assisting in the movement of the honeycombs through the cutting assembly 26.

The cutting assembly 26 includes two vertical shafts 228 and 230 rotatably supported by oppositely disposed arms 232 and 234 which are supported by vertical rods 236 and 238 which are quite similar to the supporting shafts, arms and rods for the brush assembly. Mounted on each shaft 228 and 230 is a cylindrical blade carrying member 240 having a plurality of blades 242 mounted thereon. The blades 242 extend radially from the cylinder and are generally in the form of a planer head in that the blades move in a circular path and will remove wax cappings from both surfaces of the honeycomb as the honeycomb passes therebetween. The shafts 228 and 230 are driven from pulleys 244 connected with the upper ends thereof and twisted drive belts 246 which encircle pulleys 248 carried by a shaft 250 supported by bearing blocks 252 on a plate or platform 254 that are supported from the upper end of the supporting rods 236 and 238 for the arms 232 and 234. The shaft 250 is driven by an end pulley 256 connected thereto and a belt drive 258 which extends downwardly and engages a drive pulley 260 that is mounted on the end of the shaft 140 thus rotating the cylindrical members 240 and the cutters 242 which define planer heads at a relatively high rate of speed. The rotating blades 242 are enclosed by a pair of substantially U-shaped shields 262 and 264 which are substantially similar to the shields 180 and 182 for the brushes and the wax cappings which are removed by the high speed rotating blades or knives 242 will be discharged against the inner surface of the shields 262 and 264 and then slide down the shields through an enlarged opening 266 in the table top 46 and thus be deposited into a suitable container disposed below the table. As the honeycombs approach the rotating knives 242, the leading frame member will engage a plate 268 at the lower end of each cylinder 240 and thus cause the cylinders to move apart sufficiently so the blades 242 do not hit the end member of the honeycomb frame. As the end member of the honeycomb frame passes the planer head, the walk around plate 268 permits the planer blades 242 to move back in place and cut off the cappings of the honeycomb. The blades will thus not damage the honeycomb frame.

To retain the blades 242 urged toward each other, each pair of arms 232 and 234 is provided with a vertical plate-like member 270 that is engaged on the outer surface by a plunger 272 slidably received in a cylinder 276 with a spring 278 disposed between the plunger 272 and the closed end of the cylinder 276 so that the plunger will be urged outwardly into engagement with the plate 270 and thus spring bias the plates 270 and the arms 232 and 234 and thus the planer heads towards each other. The cylinder 276 is mounted by a suitable bracket 280 from the table top 46 and if desired, an adjustment may be provided for varying the spring tension exerted on the planer heads.

The knife blades 242 may be mounted on the cylinder 240 in any suitable manner and the cylinder 240 may have grooves such as at 282 therein for receiving corresponding projecting lugs on the knife blades for locating the knife blades and facilitate mounting thereof. The structure which supports the cog 222 and the sprocket gear 226 adjacent thereto includes a pair of upstanding rigid rods 286 with sleeves 288 mounted thereon and spring biased by springs 290 so that supporting bracket 292 attached thereto is adjustable and spring biased in the same manner as the sleeves 214 are adjustable and spring biased to retain the cog 220 in spring biased engagement with the honeycomb 30 as it passes through the cutting assembly 26.

The honeycombs continue along the conveyor chain 106 and pass out of the end of the conveyor chain with both surfaces thereof uncapped or decapped. The honeycombs 30 then move into the drip tank assembly 28 which includes an elongated drip tank 300 formed by a peripheral wall and bottom supported in a suitable manner with the tank 300 including a pair of conveyor chains 302 engaging sprocket gears 304 adjacent each end thereof which are mounted on a shaft 306 adjacent each end of the tank 300 with the chain conveyors 302 being disposed adjacent the walls of the tank as illustrated in FIG. 1 with the spacing between the chains 302 being such that the honeycombs 30 may be hung vertically therebetween with the lugs 38 thereon engaging the upper surface of the upper run of the conveyor chains 302. Inasmuch as the honeycombs 30 are discharged from the conveyor chain 106 with the lugs 38 adjacent the bottom thereof, a converter assembly generally designated by the numeral 308 is provided for inverting the honeycombs 30 from a position with the lugs lowermost to a position with the lugs being employed for suspending the honeycomb 30 from the conveyor chains 302.

Figure 13:
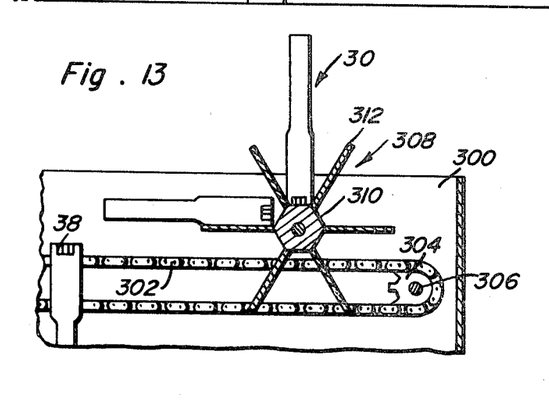
FIG. 13 is a longitudinal, sectional view taken substantially along a plane passing along section line 13—13 of FIG. 11 illustrating the specific structural details of the frame converter.

The converter structure includes an elongated drum assembly including a hub 310 and a plurality of radially extending and circumferentially spaced blades 312 thereon which are in the form of plates and provide a trough for receiving the honeycomb 30 as it is discharged from the conveyor chain 106 in the position illustrated in FIG. 13. As the converter drum 308 rotates, the honeycomb 30 is moved in an arcuate manner where it initially assumes a generally horizontal position and then is downwardly inclined and slides off of the blade or plate 312 so that the lugs 38 will be supported on the upper run of the conveyor chain 302 and the conveyor chains 302 then convey the honeycomb 30 to the opposite end of the drip tank or into a generally side by side relation with other honeycombs positioned in the drip tank. The conveyor chains 302 are driven by an electric motor 314 through a suitable chain drive and the converter 308 is also driven from a motor 315 as by a ratchet gear assembly 316 or the like.

While electric motors have been disclosed for driving the various components of the machine, it is pointed out that other sources of power may be employed such as an internal combustion engine of various types, hydraulic motors or the like. Also, the machine may be effectively employed either with or without the automatic feeding device with or without drip tank and converter assembly. Also, a ratchet type drive may be provided for driving the converter 308 since this moves intermittently or in a step by step manner as the honeycombs are received from the conveyor chain 106. This will provide a delay sufficient to enable each honeycomb to be completely deposited on the converter drum 308 before the converter drum is rotated a portion of a revolution. By providing the same number of blades as increments of movement on the ratchet drive for the converter drum, the converter drum will be appropriately timed in relation to the reception of the honeycombs from the conveyor chain 106.

The upper guide rails 120 and the lower guide rails 126 are continuous throughout the length of the table except where the brushes or cutter blades actually engage the honeycombs as they pass therethrough. Various chain tighteners, lubrication features and the like may be provided. For example, one form of chain tightener is illustrated for the chain 204 as an idler sprocket 321 engaging the interior of the chain and supported by pivot arms 323 mounted from brackets 325 or the like depending from the table structure and this assembly may employ gravity or a spring device to assure proper tension on the drive chain.

The size requirements of the various components of the machine may be varied depending upon the size of the honeycombs to be uncapped and in all instances, adequate safety devices are provided inasmuch as the shields cover and conceal the rotating brushes and the rotating knives which are moving at relatively high speeds. The microswitches control operation of the feeding mechanism and the main conveyor chain 106 is controlled with the usual switch assemblies without any specific details thereof being illustrated since these components are conventional and commercially available insofar as the electrical switch box structure and switches are concerned.

An example of the mechanical features incorporated into the device are shields for the bearings for the various rotatable brushes and knife assemblies in which a cylindrical sleeve encircles the bearings at the lower ends of the shafts such as the shafts 228 and 230 with the upper end of the sleeve being received in a peripheral groove in the lower end of the cylinder 240 thus precluding entry of honey into the bearings. Exemplary of the switch structure is switch 97 which can be operated to enable the feed chain to be driven without the rest of the machine operating which enables the feed chain to be filled with honeycomb without the rest of the machine operating during the filling cycle.

Also, a tension spring 165 interconnecting the free ends of the supporting arms 164 and 166 at the upper ends of the shafts 160 and 162 will retain the brush heads spring biased toward each other for retaining the brushes in engagement with the honeycomb frame. This spring is oriented above the upper guide rails 120 and does not interfere with the honeycombs being moved by the conveying chain 106. The shields 180 and 182 will move with the brushing heads and correspondingly, the shields for the cutting heads will also move in the same manner.

Figure 15:
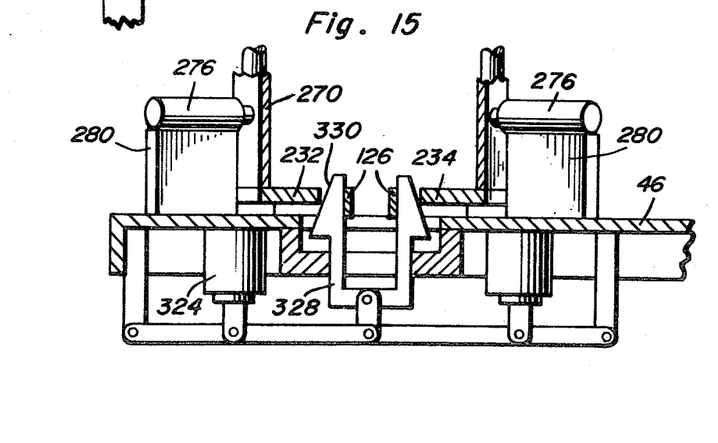
FIG. 15 is a transverse sectional view illustrating the control mechanism for positioning the rotary blades.

The thickness of the honeycomb passing through the brush assembly 24 will control the initial positioning of the rotatable cutting heads. This is accomplished by a pair of opposed arms 320 that swing on a stud-like pin 322. The arms 320 are mounted on each side of the conveyor chain 106 so that if the honeycomb is relatively thick the arms 320 will be spread apart more than if the honeycomb is relatively thin. Thus, the arms 320 through the pins 322 will operate microswitches to control solenoid coils 324 disposed under the table 46 which in turn operate a generally U-shaped wedge member 328 that have oppositely extending inclined surfaces 330 which engage the arms 232 and 234 respectively to permit the cutting blades to close closer together or to retain the cutting blades spaced further apart depending upon the thickness of the honeycomb as determined by the feeler arms 320 so that only the wax cappings on each side of the honeycomb are removed.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. In a honeycomb uncapper, a conveying means for conveying honeycombs along a predetermined path of movement with the opposed wax capped surfaces thereof exposed, and cutting means associated with the path of movement for simultane-ously cutting wax caps from the opposed surfaces of the honeycombs as they pass along the path of movement, said cutting means including blade means disposed alongside of the honeycombs for engagement with and removal of the wax caps, and a brush assembly associated with the path of movement prior to the cutting means, said brush assembly including brushes disposed on opposite sides of the path of movement, means supporting the brushes for rotation about axes substantially paralleling the exposed surfaces of the honeycombs, means drivingly engaged with the brushes for rotating the same.

2. The structure as defined in claim 1 wherein said cutting means includes a pair of rotatable elements disposed in substantially parallel relation to the opposed capped surfaces of the honeycombs as they move therebetween, said blade means being mounted on said rotatable elements, means operatively associated with the rotatable elements to rotate them at a relatively high rate of speed, means supporting the rotatable elements for movement towards and away from the path of movement to assure cutting engagement with the wax caps on the honeycomb.

3. The structure as defined in claim 2 wherein said supporting means for the rotatable elements includes spring means biasing the rotatable elements toward the honeycombs as they pass along the path of movement, and means engageable by the honeycombs as they approach the rotatable elements to move the rotatable elements apart to enable the end frames of the honeycombs to pass between the rotatable elements without engagement by the blades thereon.

4. The structure as defined in claim 3 together with an arcuate shield disposed outwardly of each rotatable element for receiving wax caps removed from the honeycombs by the blades and discharged due to the high rate of speed of rotation of the rotatable elements.

5. The structure as defined in claim 1 wherein said conveyor means includes a chain conveyor having a plurality of spaced lugs thereon for engagement with the honeycomb frame, upper and lower guide rails for engaging the upper and lower frame members of honeycombs as they pass along the path of movement.

6. The structure as defined in claim 1 wherein each brush includes an upper disk-like brush and a lower disk-like brush adapted to engage the upper and lower frame members of a honeycomb as it passes along the path of movement.

7. The structure as defined in claim 6 together with an arcuate shield disposed outwardly of each brush for receiving wax therefrom.

8. The structure as defined in claim 1 together with a drip tank assembly disposed at the end of the conveying means, said drip tank assembly including an elongated tank, spaced chain conveyors disposed in said tank for suspending honeycombs therefrom, and a rotatable drum disposed between the chain conveyors in the drip tank and receiving honeycombs from the conveying means and discharging the honeycombs in a vertical position suspended from the conveyor chains.

9 In a honeycomb uncapper, a conveying means for conveying honeycombs along a predetermined path of movement with the opposed wax capped surfaces thereof exposed, and cutting means associated with the path of movement for simultaneously cutting wax caps from the opposed surfaces of the honeycombs as they pass along the path of movement, said cutting means including blade means disposed alongside of the honeycombs for engagement with and removal of the wax caps, a drip tank assembly disposed at the end of the conveying means, said drip tank assembly including an elongated tank, spaced chain conveyors disposed in said tank for suspending honeycombs therefrom, and a rotatable drum disposed between the chain conveyors in the drip tank and receiving honeycombs from the conveying means and discharging the honeycombs in a vertical position suspended from the conveyor chains, said drum including a plurality of circumferentially spaced radial blades mounted thereon with the blades defining longitudinally disposed troughs for receiving a honeycomb from the conveying means when in an upwardly facing direction with subsequent incremental rotation of the drum serving to invert the honeycomb and suspend it from the conveyor chains in the drip tank, and means connected with the drum for intermittently rotating the drum.

10. The structure as defined in claim 1 together with a feed mechanism for automatically feeding honeycombs onto the conveying means for movement along the path of movement, said feed mechanism including a conveyor disposed laterally of the conveying means and communicating therewith for discharging honeycombs onto the conveying means.

11. The structure as defined in claim 10 wherein guide means is associated with the conveyor extending laterally from the conveyor means for engaging the honeycombs and maintaining them in upright position, and means automatically controlling discharge of honeycombs from the feeding conveyor to the conveying means for associating the honeycombs singly in an upright position on the conveyor means.

12. In a honeycomb uncapper, a conveying means for conveying honeycombs along a redetermined path of movement with the opposed wax capped surfaces thereof exposed, and cutting means associated with the path of movement for simultaneously cutting wax caps from the opposed surfaces of the honeycombs as they pass along the path of movement, said cutting means including blade means disposed alongside of the honeycombs for engagement with and removal of the wax caps, said cutting means including a pair of rotatable elements disposed in substantially parallel relation to the opposed capped surfaces of the honeycombs as they move therebetween, said blade means being mounted on said rotatable elements, means operatively associated with the rotatable elements to rotate them at a relatively high rate of speed, means supporting the rotatable elements for movement towards and away from the path of movement to assure cutting engagement with the wax caps on the honeycomb, said supporting means for the rotatable elements including spring means biasing the rotatable elements toward the honeycombs as they pass along the path of movement, and means engageable by the honeycombs as they approach the rotatable elements to move the rotatable elements apart to enable the end frames of the honeycombs to pass between the rotatable elements without engagement by the blades thereon, an arcuate shield disposed outwardly of each rotatable element for receiving wax caps removed from the honeycombs by the blades and discharged due to the high rate of speed of rotation of the rotatable elements, said conveying means including a chain conveyor having a plurality of spaced lugs thereon for engagement with the honeycomb frame, upper and lower guide rails paralleling the chain conveyor for engaging the upper and lower frame members of honeycombs as they pass along the path of movement, a brush assembly disposed along the chain conveyor prior to the cutting means, said brush assembly including a pair of brushes disposed on opposite sides of the conveyor chain, means supporting the brushes for rotation about axes substantially paralleling the exposed surfaces of the honeycombs, means drivingly engaged with the brushes for rotating the same, spring means associated with each of the brushes for biasing the brushes toward each other, each brush including an upper disk-like brush and a lower disk-like brush adapted to engage the upper and lower frame members of a honeycomb as it passes along the chain conveyor, an arcuate shield disposed outwardly of each brush for receiving wax therefrom, a drip tank assembly disposed at the end of the conveyor chain, said drip tank assembly including an elongated tank, spaced conveyor chains disposed in said tank for suspending honeycombs therefrom, a rotatable drum disposed between the conveyor chains and the tank and the elongated conveyor chain for receiving honeycombs therefrom and discharging the honeycombs in a vertical position suspended from the conveyor chains in the tank, said drum including a plurality of circumferentially spaced radial blades mounted thereon with the blades defining longitudinally disposed troughs for receiving a honeycomb from the conveying chain when in an upwardly facing direction with subsequent incremental rotation of the drum serving to invert the honeycomb and suspend it from the conveyor chains in the tank, means connected with the drum for intermittently rotating the drum, a feed mechanism for automatically feeding honeycombs onto the conveying chain for movement along the path of movement, said feed mechanism including a conveyor disposed laterally of the conveying chain and communicating therewith for discharging honeycombs onto the conveying means one at a time, guide means associated with the conveyor extending laterally from the conveying chain for engaging the honeycombs and maintaining them in upright position, and means automatically controlling the discharge of honeycombs from the feeding conveyor to the conveyor chain for associating the honeycombs singly in an upright position with the lugs on the conveying chain.

13. A honeycomb uncapper comprising conveying means for conveying honeycombs along a predetermined horizontal path of movement with the honeycombs disposed vertically and the opposed wax capped surfaces thereof exposed, rotary brushes disposed on opposite sides of the path of movement of the honeycombs, means operatively associated with the rotary brushes to rotate them, means supporting the rotary brushes for rotation about vertical axes and for movement towards and away from the path of movement to assure brushing engagement with the honeycombs, rotary cutting elements disposed vertically in substantially parallel relation to the opposed capped surfaces of the honeycombs as they move therebetween after being brushed by said brushes, blades mounted on said rotary cutting elements, means operatively associated with the rotary cutting elements to rotate them at a relatively high rate of speed, and means supporting the rotary cutting elements for movement towards and away from the path of movement to assure cutting engagement of the blades with the wax caps on the honeycombs.

14. The structure as defined in claim 13 wherein each brush includes an upper disk-like brush and a lower disk-like brush spaced from each other and adapted to engage the upper and lower frame members of the honeycomb as it passes between the brushes.

15. The structure as defined in claim 13 together with an arcuate shield disposed vertically outwardly of each brush for receiving wax therefrom, and an arcuate shield disposed outwardly of each rotary cutting element to receive wax therefrom.

16. The structure as defined in claim 15 wherein said conveying means includes a horizontally disposed conveyor chain having lugs thereon for engagement with the honeycombs, a portion of said conveying means including means engaging the top surface of each honeycomb for assisting the conveyor chain in moving the honeycombs between the rotary cutting elements.

* * * * *